United States Patent

Hewitt

[11] Patent Number: 5,964,883
[45] Date of Patent: *Oct. 12, 1999

[54] ARRANGEMENT AND METHOD FOR HANDLING BUS CLOCK SPEED VARIATIONS

[75] Inventor: Larry David Hewitt, Austin, Tex.

[73] Assignee: Advanced Micro Devices, Austin, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/754,206

[22] Filed: Nov. 20, 1996

[51] Int. Cl.$^6$ .............................. G06F 1/04; G06F 15/16
[52] U.S. Cl. .............................. 713/503; 709/248; 710/16
[58] Field of Search .............................. 395/500, 200.51, 395/200.54, 828, 834, 835, 836, 558, 559, 500.07; 709/221, 224, 400, 248; 713/503, 600; 710/8, 14, 15, 16

[56] References Cited

U.S. PATENT DOCUMENTS

| | | | |
|---|---|---|---|
| 4,344,132 | 8/1982 | Dixon et al. | 364/200 |
| 5,115,503 | 5/1992 | Burkin | 395/550 |
| 5,566,325 | 10/1996 | Bruce, II et al. | 395/494 |
| 5,657,482 | 8/1997 | Klein | 395/558 |
| 5,687,371 | 11/1997 | Lee et al. | 395/651 |

FOREIGN PATENT DOCUMENTS

| | | |
|---|---|---|
| 0 628 910 | 12/1994 | European Pat. Off. . |
| 0 702 308 | 3/1996 | European Pat. Off. . |
| 04326410 | 11/1992 | Japan . |

OTHER PUBLICATIONS

Microsoft Press Computer Dictionary, pp. 76, 196 (2d ed.), 1994.

*Primary Examiner*—Mark H. Rinehart
*Attorney, Agent, or Firm*—Merchant & Gould P.C.

[57] ABSTRACT

An arrangement for monitoring clock frequency variations on a peripheral bus is provided to improve operations of the peripheral device despite changes in the clock frequency. In one aspect of the arrangement, a processing unit is coupled to a host bus which in turn is coupled to a peripheral bus which is coupled to a peripheral device. A monitoring arrangement is provided which detects a change in the clock frequency of the peripheral bus and determines if the frequency change exceeds a threshold associated with the peripheral device. If the threshold is exceeded, the peripheral device is informed that the clock frequency of the peripheral bus has changed. A peripheral device operating a different operating levels may use the information from the monitoring arrangement to alter the operating level of the peripheral device to conform to the new bus clock frequency.

17 Claims, 4 Drawing Sheets

ARRANGEMENT AND METHOD FOR HANDLING BUS CLOCK SPEED VARIATIONS

FIELD OF THE INVENTION

The present invention is directed to an arrangement and method for handling variations in bus clock speed, and more particular, for handling such variations on bus on which a peripheral device is located.

BACKGROUND OF THE INVENTION

Over the past several years, computer processing power has increased dramatically. With this increase in processing power, the number and types of tasks which computer systems are used to perform have also increased greatly. For example, multimedia systems, which receive, process and output information using a number of different media types, have found great popularity. In order to handle the increased types of media such as video and audio, the number and types of peripheral devices which are coupled to a computer system have also increased. Generally, a peripheral device connects to another device (e.g., a host device) which controls the operation of the peripheral device. In a typical system, the host processor is coupled to a local (e.g., host) bus. In many applications, the number of other devices which may be directly connected to the host bus is quite limited. In order to expand the versatility of such systems, one or more secondary buses are coupled to the host bus.

Peripheral devices are coupled to the secondary (peripheral) buses for communication with the host. The host processor controls the peripheral devices using the host and peripheral buses.

As the number of peripheral devices effectively coupled to the host processor increases, the complexity of controlling the various peripheral devices also increases. Moreover, as the number and complexity of functions provided by the peripheral devices expands, the operation of the peripheral devices becomes more dependent upon stability of the system. A typical peripheral bus, such as the Peripheral Component Interface (PCI) bus, operates under control of the host system. The host system may modify operating parameters of the PCI bus without notifying the peripheral device. The consequences of changing bus parameters to the operation of complex peripheral device are significant.

In the above described types of systems, the desire to provide more complicated and versatile peripheral devices competes with the desire to allow the host processor freedom to control the overall system and its operating parameters. Thus, it is desirable to provide a system having increased capability through the use of many different types of peripheral devices without limiting the operation of the host processor.

SUMMARY OF THE INVENTION

Generally, the present invention provides effective handling of variations in clock speeds on a peripheral bus. In one particular embodiment, the present invention is implemented in system having a processing unit coupled to a host bus and a peripheral device coupled to a peripheral bus. A monitoring arrangement is provided in the system which detects a change in the clock frequency of the peripheral bus and determines if the frequency change exceeds a threshold associated with the peripheral device. When the threshold is exceeded, the peripheral device is informed that the clock frequency of the peripheral bus has changed.

BRIEF DESCRIPTION OF THE DRAWINGS

The invention may be more completely understood in consideration of the following detailed description of various embodiments of the invention in connection with the accompanying drawings, in which.

Figure 1:
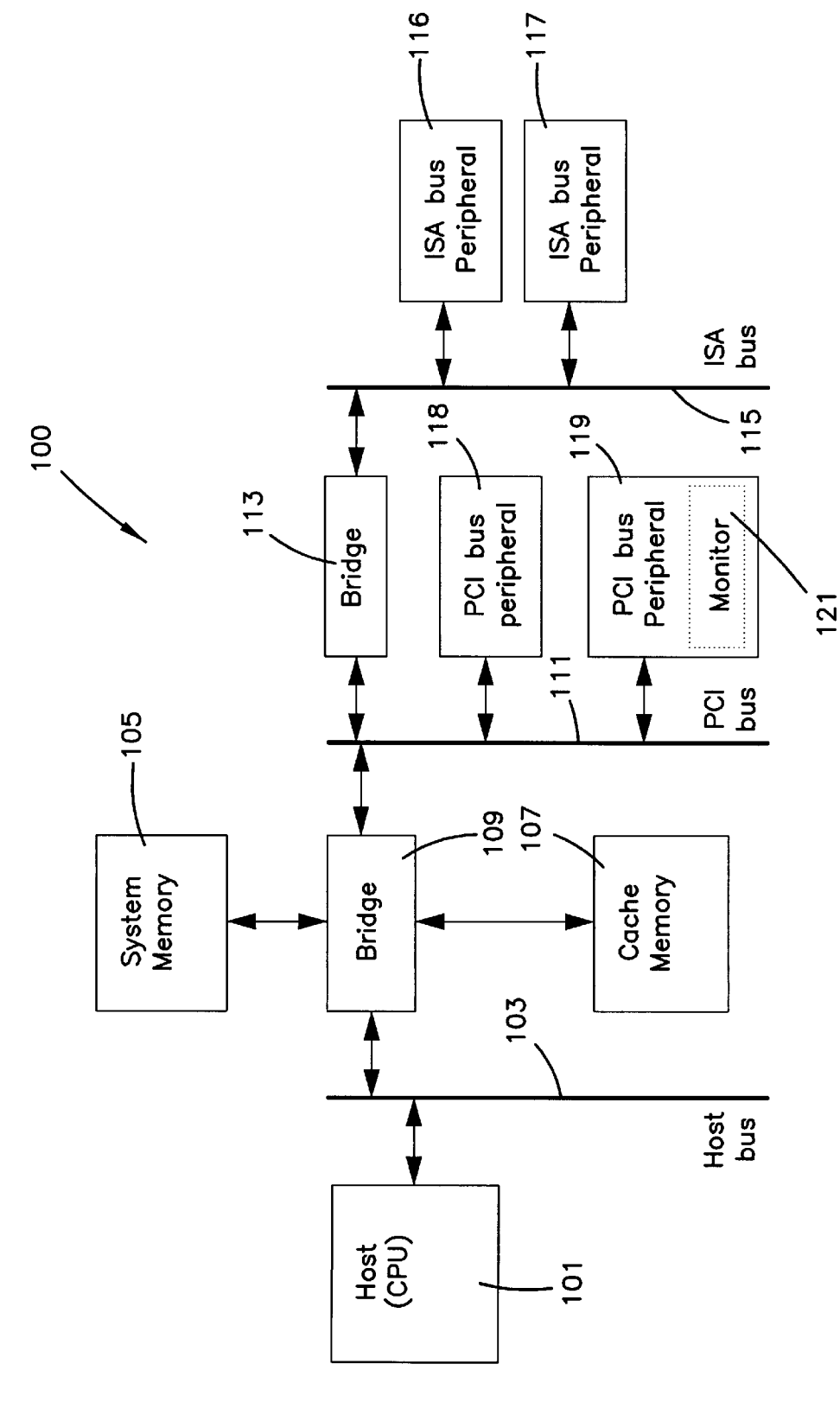
FIG. 1 illustrates a system in accordance with an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention is believed to be applicable to a variety of computer arrangements and bus structures. The invention has been found to be particularly advantageous in application environments where a peripheral device is coupled to a peripheral bus, such as a PCI-type bus, and where a host processor controls the operation of the peripheral bus in a manner which would affect the operation of the peripheral device. While the present invention is not so limited, an appreciation of various aspects of the invention is best gained through a discussion of various application examples operating in such an environment.

FIG. 1 illustrates a system 100 operating in such an environment. System 100 includes a host processor 101 which is coupled to a host bus 103. A cash memory 107 is also coupled to the host bus 103. A system memory 105 is coupled to the host bus 103 via a first bridge 109. A PCI bus 111 is coupled to the host bus 103 via bridge 109. A second bridge 113 couples the PCI bus 111 to an ISA bus 115. ISA bus peripherals 116 and 117 are coupled to the ISA bus 115. PCI bus peripherals 117 and 119 are coupled to the PCI bus 111. In the illustrated embodiment, a monitor unit 121 is incorporated into the PCI bus peripheral 119.

The host processor 101 controls the operation of the PCI bus 111 and ISA bus 115. One operating parameter of the PCI bus 111 which may be altered by the host processor is the bus clock frequency. The frequency of the PCI clock may be changed by the host processor without notice to the PCI peripheral devices 117 and 119. A reduction in clock frequency of the PCI bus 111 may occur, for example, when the host processor enters a power conservation mode. In FIG. 1, the PCI peripheral 119 uses the PCI bus clock in its internal circuitry. As result, the variations in the clock frequency of the PCI bus impacts the operation of the PCI peripheral 119. In the illustrated example, the monitor unit 121 is incorporated into the PCI peripheral 119 and monitors the PCI bus 111 for changes in the clock frequency of the PCI bus 111.

If the monitor unit 121 detects a change in the clock frequency of the PCI bus 111, the monitor unit 121 informs driver software for the PCI bus peripheral 119, running on the host processor 101, that the PCI bus clock frequency has changed. In response, the driver software determines the current PCI bus clock frequency. The driver software uses the current PCI bus clock frequency to determine an appropriate performance or operating level for the PCI bus peripheral 119. If the determined performance or operating level is different than the current level, the driver software changes the current level to the determined level. In this manner, the operation of the PCI bus peripheral 119 is maintained at an appropriate level. The monitor unit 121 detects changes in the PCI bus clock frequency regardless of the direction (i.e., increased and decreased frequency).

Changes in the PCI bus clock frequency may have significant impact on the operation of PCI bus peripheral 119. When the processing capability or operating level of the PCI bus peripheral depends upon the clock frequency, different operating levels may be associated with different frequency ranges. For example, PCI bus peripheral 119 may incorporate a digital signal processor (DSP) which is used to process audio information. Such a peripheral device may be used to perform a number of different audio processing functions, all of which may not be necessary for acceptable performance. For example, the audio processor may be coupled with a musical instrument audio processor to process a number of different musical instruments simultaneously. At a maximum speed, such a device may be capable of handling 32 instruments simultaneously. If, the number of instruments handled by the processor were cut back to 24 or 16, the effect on the user's experience would be fairly minimal and would likely be unnoticed.

In such a device a higher clock rate may be required to handle 32 simultaneous instruments, while a lower clock rate may be sufficient to handle 16. When the monitor unit 121 is coupled to this type of peripheral device, the driver software for the peripheral device may use the indication from the monitor unit that the clock frequency has changed to determine whether the current clock frequency supports 32, 24 or 16 instruments. The driver software may reduce or increase the number of instruments handled simultaneously based on the current clock frequency.

In FIG. 1 the monitor unit 121 is illustrated as being incorporated into the PCI bus peripheral 119. The monitor unit may alternatively be coupled directly to the PCI bus 111 and be used to inform driver software for multiple peripheral devices that the clock frequency of the monitored bus has changed. In such a system, a single monitoring unit may be configured and arranged to provide different indications based on the level of frequency change in accordance with the types of peripheral devices connected to the monitored bus.

Figure 2:
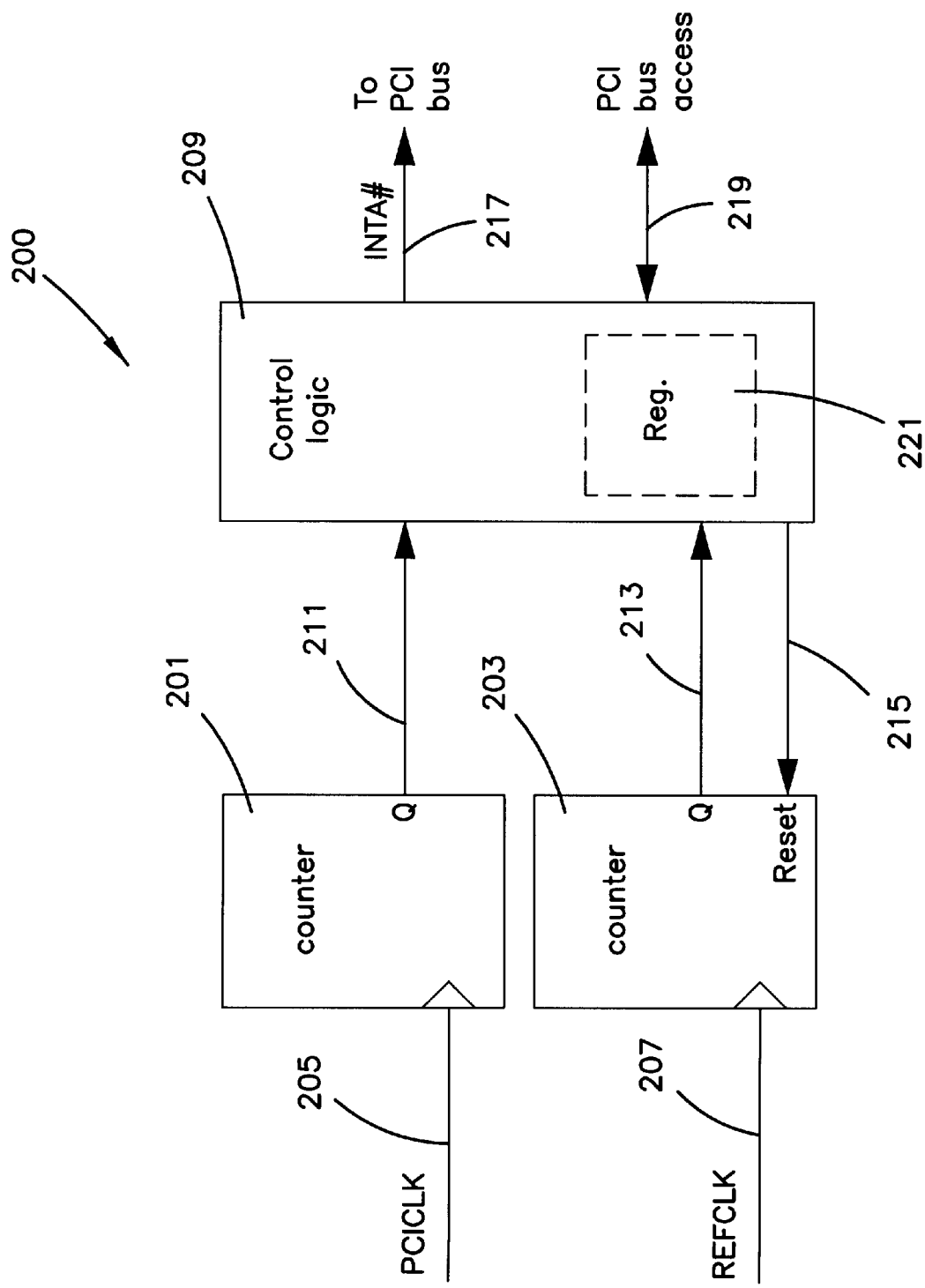
FIG. 2 illustrates a monitoring unit in accordance with an embodiment of the present invention.

FIG. 2 illustrates a monitoring circuit 200 in accordance with one particular embodiment of the invention. Monitoring circuit 200 includes a first counter 201 and a second counter 203. The first counter 201 counts the PCI bus clock cycles (PCICLK) provided to the first counter 201 on line 205. The second counter 203 counts reference clock cycles (REFCLK) provided on line 207. The outputs 211 and 213 from counters 201 and 203, respectively, are provided to a control logic circuit 209. The control logic circuit 209 includes a bank of registers 221, which are accessible by the host processor. As will be described more fully below, the frequency monitor circuit 200 operates to notify driver software of a corresponding peripheral device when the PCI bus clock frequency has changed by an amount which exceeds a predetermined threshold.

Figure 3:
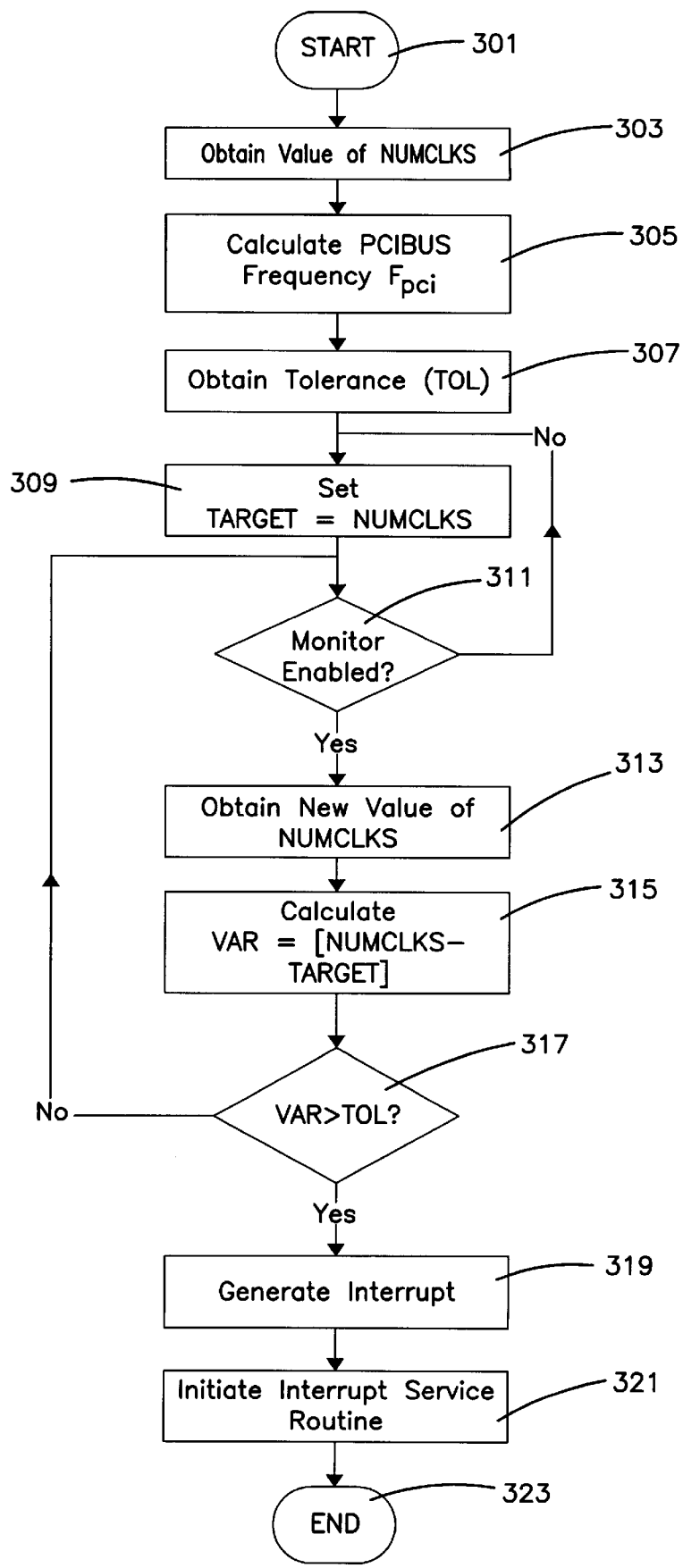
FIG. 3 illustrates a flow chart depicting one aspect of the present invention.

FIG. 3 illustrates an exemplary system flow of one embodiment of the invention. At power up the driver software of an associated peripheral device calculates an initial PCI bus clock frequency $F_{pci}$ using a value designated as NUMCLKS obtained at step 303. The NUMCLKS value is obtained from the register bank 221 (FIG. 2) which is determined as follows.

Referring to FIG. 2, the reference clock signal REFCLK is desirably set at a speed which is slower than the maximum clock frequency of the PCI bus. In one particular embodiment, the first counter 201 is implemented using a 16-bit counter and the second counter 203 is implemented using a 32-bit counter. In this example, the first counter 201 is free running from 0 to 65535. The second counter 203 counts the REFCLK and is reset each time the first counter 201 rolls over to 0. The control logic 209 captures the state of the second counter 203 immediately prior to being reset and stores this value in a NUMCLKS register of the register bank 221.

Returning to FIG. 3, the PCI clock frequency $F_{pci}$ is calculated at step 305 using the NUMCLKS value. In the above example using 16-bit and 32-bit counters, the ratio of the PCI bus clock frequency $F_{pci}$ to the REFCLK frequency $F_{ref}$ is equal to the ratio of 16536 to the NUMCLKS value. Accordingly, the PCI bus clock frequency $F_{pci}$ can be obtained using the following relation:

$$F_{pci} = F_{ref} \times 16536 \div \text{NUMCLKS}$$

The reference clock REFCLK used by the second counter 203 may be obtained from any convenient source having a constant clock frequency. The peripheral device in which the monitor is incorporated may have a crystal oscillator, for example, which may be used for the reference clock. If a reference clock is not available in the peripheral device, or more generally when the monitor is coupled directly to the monitored bus, an appropriate reference clock may be derived from elsewhere in the system. For example, typical personal computers have a 14.3 MHz clock available for use. What is important is that the reference clock have a constant frequency within an acceptable frequency range. The above frequency calculation is based on the size of the counters 201 and 203 used. It should be recognized that the size of the counters used could be changed depending on the particular implementation. Using a few number of bits in counter 201 allows the clock rate to be checked more frequently. However, the more frequent the check, the lower the accuracy of the measurement will be. The accuracy also depends on the reference clock REFCLK frequency. As the reference clock REFCLK frequency decreases, the frequency measurement becomes less accurate.

After the PCI bus frequency $F_{pci}$ is calculated at step 305, the driver software sets a tolerance value TOL into a TOLERANCE register in the register bank 221. The tolerance value TOL is used by the system, as described more fully below, to determine whether or not an extent of change in the PCI bus clock frequency exceeds a desirable threshold. This value is determined in accordance with the characteristics of the corresponding peripheral device. Some peripheral devices may have a large tolerance for frequency changes while others may have a small tolerance. In one particular embodiment, the monitoring unit may be used to monitor variations in clock frequency for multiple peripheral devices. Such a monitoring unit could incorporate a number of tolerance value registers, each being associated with a particular peripheral device. In this instance, when a frequency change indication is generated, the system will determine which tolerance value was exceeded and undertake the appropriate action.

After the tolerance value TOL is obtained at step 307, the driver initializes a target value TARGET to the value found in the NUMCLKS register. The target value is stored in a TARGET register in the register bank 221. The initialized target value TARGET represents the number of clock cycles expected to be latched in the NUMCLKS register when counter 201 rolls over if the PCI clock frequency has not changed. At step 311 the system determines if the frequency change monitoring function of the monitoring circuit 200 function has been enabled. If the frequency change monitoring function is enabled, a new value of NUMCLKS is obtained at step 313. At step 315, a frequency variance value VAR is calculated as the absolute value of the difference between the NUMCLKS value in the NUMCLKS register and the TARGET value in the TARGET register. The calculated variance VAR is compared with the tolerance TOL value set in the TOLERANCE register at step 317. If the variance VAR is not greater than the tolerance TOL, the system returns to step 311. This process continues until the frequency change monitoring circuit is disabled or the variance VAR exceeds the tolerance TOL at step 317. When the variance VAR is greater than the tolerance TOL, the system proceeds to step 319 and generates an interrupt signal. At step 321, the source of the interrupt is identified and the appropriate interrupt service routine is initiated.

In addition to the TARGET, TOLERANCE and NUM-CLKS registers, the register bank 221 also stores a CONTROL register. The control bits in CONTROL register may be implemented in one particular embodiment as follows:

| 7 | 6 | 5 | 4 | 3 | 2 | 1 | 0 |
|---|---|---|---|---|---|---|---|
| Rsvd | Rsvd | Rsvd | Rsvd | Rsvd | Rsvd | EN | INTA# |

The CONTROL register is reset to 'h01. The INTA# bit is set low by the control logic hardware if the enable bit EN is set high and the frequency variation VAR exceeds the tolerance TOL. This bit can also be written to by the PCI bus. The enable bit EN is set high to enable the frequency change monitoring function and set low to disable the frequency change monitoring function. The remaining bits are reserved and are not alterable by the host. In an alternative embodiment, one or more additional bits may correspond to other peripheral devices with different tolerance values.

The CONTROL register is used by the driver to detect when the interrupt has occurred and also to disable the frequency change monitoring function. The INTA# is set by the control logic when it detects a change in bus clock frequency. This notifies the host which device has generated the interrupt. Since interrupts on the PCI bus are chainable, multiple devices may be generating the interrupt for any number of reasons. Thus, when an interrupt is detected, the host looks at all possible sources for the interrupt to identify which source has generated the interrupt. By examining bit 0 of the CONTROL register, the host is able to identify that the interrupt came from the frequency change monitoring device. Once the interrupt service routine detects that the interrupt was generated by the frequency change device, bit 0 is cleared to a high value so that it may be set again by the hardware for the next PCI clock frequency change.

Figure 4:
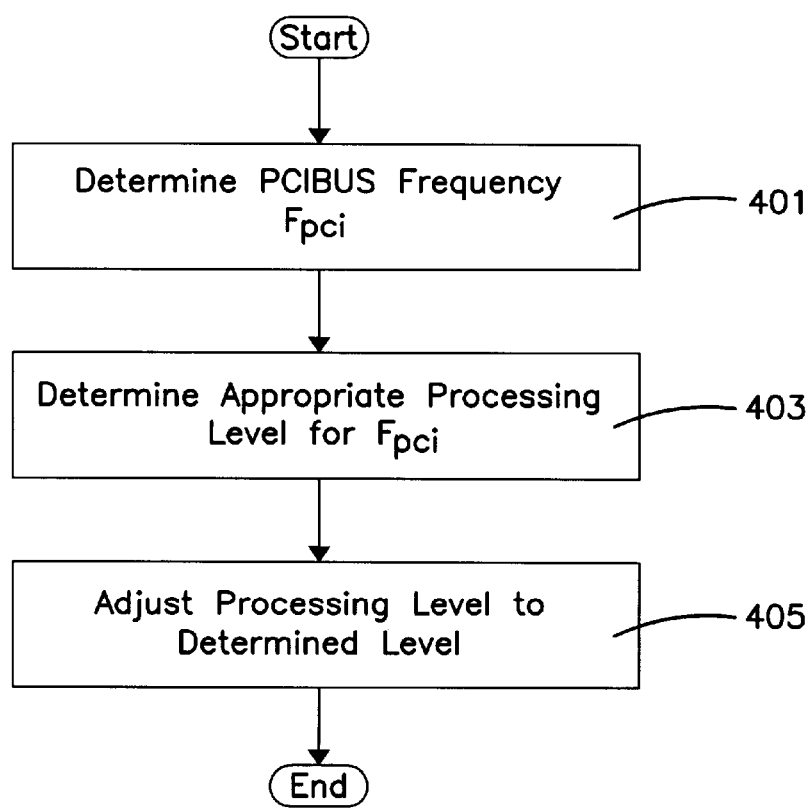
FIG. 4 illustrates a flow chart depicting another aspect of the present invention.

FIG. 4 illustrates the operation of the system once a change in the clock frequency of the PCI bus has been detected. Upon notification by the frequency change monitoring circuit that the bus clock frequency has changed, the current PCI bus clock frequency $F_{pci}$ is calculated at step 401. This again may be done using the NUMCLKS value and the above relationship. At step 403 the system determines the appropriate processing level for the current clock frequency of the PCI bus $F_{pci}$. Finally, at step 405, the processing level of the peripheral device is adjusted to the level determined at step 403. It should be noted that the processing levels may simply correspond to an on and off states, or may correspond to multiple levels of processing operations as described more fully above.

In accordance with the above described embodiments, an arrangement and method is provided which automatically alerts the host (or the driver that executes from the host) when the PCI clock frequency changes by a certain amount. The driver software on the host is then able to determine if and how the operation of the PCI bus peripheral should be altered in view of the change in the clock frequency of the PCI bus. The various embodiments described above are provided by way of illustration only and should not be construed to limit the invention. Those skilled in the art will readily recognize various modifications and changes which may be made to the present invention without strictly following the exemplary embodiments and applications illustrated and described herein, and without departing from the true spirit and scope of the present invention which is set forth in the following claims.

I claim:

1. A system comprising:

a host bus;

a host processing unit coupled to the host bus;

a peripheral bus coupled to the host bus;

a peripheral device coupled to the peripheral bus; and a frequency monitoring unit configured and arranged to detect a frequency variation between a clock frequency of the peripheral bus at two different times during operation of the host processing unit, which exceeds a change threshold associated with the peripheral device and to generate a frequency change indication which indicates that the clock frequency of the peripheral bus has changed by an amount which exceeds the change threshold.

2. A system as recited in claim 1, wherein the peripheral bus comprises a peripheral component interface (PCI) bus.

3. A system as recited in claim 1, wherein the frequency monitoring circuit further comprises:

a bus counter for counting clock cycles of a peripheral bus clock;

a reference counter for counting clock cycles of a reference clock, the reference counter being reset when the bus counter exceeds its counting capacity; and a control unit arranged and configured to receive a number of clocks counted by the reference clock immediately prior to being reset and to determine whether the number of clocks counted differs from a target number of clocks by a predetermined amount, the control unit generating an interrupt signal when the number of clocks counted differs from the target number of clocks by the predetermined amount.

4. A system as recited in claim 1, wherein the peripheral device operates at a plurality of operating levels, the system further comprising a control unit responsive to the frequency change indication to determine a current clock frequency of the peripheral bus, the control unit determining an appropriate operating level of peripheral device for the current clock frequency and adjusting the operating level of the peripheral to the appropriate operating level.

5. A system as recited in claim 1, wherein the host processing unit executes a driver program associated with the peripheral device.

6. A system as recited in claim 5, further comprising a plurality of registers accessible by the host processing unit, the plurality of registers including:

a first register storing a first value indicating a number of clock cycles of a reference clock expected during a predetermined number of peripheral bus clock cycles;

a second register storing a second value indicating a number of clock cycles of the reference clock actually occurring during a predetermined number of peripheral bus clock cycles;

a third register storing a difference value which indicates a maximum acceptable difference between the first and second values.

7. A system as recited in claim 6, wherein the frequency monitoring unit detects the frequency variation, in the clock frequency of the peripheral bus, which exceeds the change threshold associated with the peripheral device, by comparing the difference between the first and second value with the difference value.

8. A system as recited in claim 6, wherein the driver program calculates a current clock frequency of the peripheral bus using the second value and a clock frequency of the reference clock.

9. A system for controlling system operation in a system having a processing unit coupled to a host bus and a peripheral device coupled to a peripheral bus, the peripheral bus being coupled to the host bus, the system comprising:

means for detecting a frequency variation between the clock frequency of the peripheral bus at two different times during operation of the processing unit;

means for determining if the frequency variation exceeds a predetermined change threshold associated with the peripheral device; and means, operative when the predetermined change threshold is exceeded, for informing the peripheral device that the clock frequency of the peripheral bus has changed by an amount which exceeds the change threshold.

10. A system as recited in claim 9, further comprising:

means for generating a change signal when the predetermined change threshold is exceeded;

means for determining a current clock frequency of the peripheral bus in response to the change signal; and means for generating a control signal for transmission to the peripheral device based on the determination of the current clock frequency.

11. A system as recited in claim 9, wherein the means for detecting a frequency variation comprises:

means for counting a predetermined number of clock cycles of the peripheral bus clock;

means for counting a number of reference clock cycles of a reference clock occurring during the predetermined number of clock cycles of the peripheral bus clock; and means for comparing the counted number of reference clock cycles with an expected number of reference clock cycles, a frequency variation being detected when the counted number of reference clock cycles differs from the expected number of reference clock cycles.

12. A method of controlling system operation in a system having a processing unit coupled to a host bus and a peripheral device coupled to a peripheral bus, the peripheral bus being coupled to the host bus, the method comprising:

detecting a frequency variation in the clock frequency of the peripheral bus at two different times during operation of the processing unit;

determining if the frequency variation exceeds a predetermined change threshold associated with the peripheral device; and in response to the frequency variation exceeding the predetermined change threshold, informing the peripheral device that the clock frequency of the peripheral bus has changed by an amount which exceeds the change threshold.

13. A method as recited in claim 12, wherein informing comprises:

generating a change signal when the predetermined change threshold is exceeded;

determining a current clock frequency of the peripheral bus in response to the change signal; and generating a control signal for transmission to the peripheral device based on the determination of the current clock frequency.

14. A method as recited in claim 12, wherein the detecting comprises:

counting a predetermined number of clock cycles of the peripheral bus clock;

counting a number of reference clock cycles of a reference clock occurring during the predetermined number of clock cycles of the peripheral bus clock; and comparing the counted number of reference clock cycles with an expected number of reference clock cycles, a frequency variation being detected when the counted number of reference clock cycles differs from the expected number of reference clock cycles.

15. A method as recited in claim 14, wherein the determining further includes:

obtaining an absolute value difference between the counted number of reference clock cycles and the expected number of reference clock cycles; and determining if the absolute value difference exceeds the predetermined change threshold.

16. A method as recited in claim 14, further including calculating a current clock frequency using the frequency of the reference clock and the counted number of reference clock cycles.

17. A method as recited in claim 13, wherein the peripheral device operates at a plurality of operating levels and the control signal initiates a changes the operating level of the peripheral device based on the current clock frequency.

* * * * *